United States Patent [19]
Cipollini et al.

[11] Patent Number: 5,169,811
[45] Date of Patent: Dec. 8, 1992

[54] BENEFICIATED LANTHANUM CHROMITE FOR LOW TEMPERATURE FIRING

[75] Inventors: Ned E. Cipollini, Vernon, Conn.; Beili L. Wu, Morristown, N.J.; Stephen Haig, Highland Park, N.J.; Jean Yamanis, Morristown, N.J.

[73] Assignee: Allied-Signal Inc., Morristownship, N.J.

[21] Appl. No.: 643,255

[22] Filed: Jan. 22, 1991

[51] Int. Cl.$^5$ .............. C04B 35/04; C04B 35/51; C04B 35/42; C01G 39/00

[52] U.S. Cl. ...................... 501/117; 501/12; 501/108; 501/126; 501/152; 252/518; 252/521; 423/263; 423/593; 423/606

[58] Field of Search ............... 501/12, 108, 117, 126, 501/152, 94, 103; 252/518, 521; 423/263, 593, 606; 264/83

[56] References Cited
U.S. PATENT DOCUMENTS

| | | | |
|---|---|---|---|
| 4,749,632 | 8/1988 | Flandermeyer et al. | 429/12 |
| 4,830,780 | 1/1989 | Olson et al. | 252/521 |
| 4,845,056 | 7/1989 | Yamanis | 501/12 |

OTHER PUBLICATIONS

Groupp & Anderson, J. Am. Cerm. Soc. 59, 449 (1976) "Densification of $La_{1-x}Sr_xCrO_3$".
Meadowcroft & Wimmer, Am. Cerm. Soc. Bull. 58, 610 (1979), "Oxidation and Vaporization Processes in Lanthanum Chromite".

*Primary Examiner*—Mark L. Bell
*Assistant Examiner*—Michael Marcheschi
*Attorney, Agent, or Firm*—Ernest D. Buff; Gerhard H. Fuchs

[57] ABSTRACT

A lanthanum chromite ceramic powder mixture that consists essentially of 1 mol of $LaCr_{1-x}M_xO_3$, where M is a divalent metal selected from the group consisting of magnesium, calcium and mixtures thereof and x ranges from 0.03 to 0.3; y mols of $B_2O_3$, where y ranges from 0.005 to 0.04; and z mols of $La_2O_3$, where the ratio z/y ranges from 1.1 to 3. The mixture is formed into powder compacts and sintered to near full density at temperatures as low as 1400° C.

12 Claims, No Drawings

BENEFICIATED LANTHANUM CHROMITE FOR LOW TEMPERATURE FIRING

BACKGROUND OF THE INVENTION

1. Field of the Invention

This invention relates to ceramic powders and compacts sintered therefrom; and more particularly to a lanthanum chromite ceramic powder and powder compact adapted to be sintered at low temperatures.

2. Description of the Prior Art

Solid oxide fuel cells (SOFC) have high Potential in producing electrical energy from cheap fuels or by-product waste gas streams of the petrochemical and metallurgical industries. The potential of these fuel cells lies in the high efficiency of converting chemical to electrical energy and could find extensive applications in the domestic, commercial, defense, and aerospace sectors of the economy. The realization of this potential is contingent on the development of reliable and cost efficient methods of cell fabrication.

One of the solid oxide fuel cell designs resembles a heat exchanger with a honeycomb structure in which the electroactive ceramic components also serve as the structural members and eliminate the need for inert supports. This design is referred to as the monolithic solid oxide fuel cell (MSOFC). The honeycomb structure of the MSOFC is made up of thin layers of four components: (1) anode usually made of a nickel-zirconia cermet; (2) electrolyte made of a fully stabilized (cubic) zirconia; (3) cathode made of strontium-doped lanthanum manganite ($LaMnO_3$); and, (4) interconnect made of doped lanthanum chromite ($LaCrO_3$) The anode, electrolyte and cathode layers when co-sintered into a laminated structure, in the same order, make up one cell. The interconnect serves as an internal electrical connection between the individual cells and is also formed in a laminated structure sandwiched between anode and cathode layers. While the anode and cathode layers need to retain high porosity to facilitate gas-solid reactions, the electrolyte and interconnect layers must be sintered to closed porosity to prevent the intermixing of fuel and oxidant gases.

The monolithic solid oxide fuel cell offers lower material costs, the potential for reduced manufacturing costs, and a higher efficiency over other geometries and designs. However, fabrication of these cells is expected to be more complicated because the individual components in thin sheet form must be formed into multilayer sheets which are then converted into a honeycomb structure and must be co-sintered at the same relatively low temperature. Of particular importance is the sintering behavior of the interconnect material, that is, lanthanum chromite which must be sintered to close porosity or about 94% of its theoretical density at temperatures of about 1400° C. in air or oxygen-containing atmospheres.

Lanthanum Chromite is a refractory material with a melting point of 2510° C. which requires very high temperatures and controlled atmospheres, i.e. extremely low partial pressures of oxygen for sintering to near theoretical density. Groupp and Anderson (L. Groupp and H. U. Anderson), J. Am. Ceram. Soc., 59, 449 (1976)) have shown that $LaCrO_3$ does not sinter in air even at temperatures as high as 1720° C. According to the data reported by these investigators, $LaCrO_3$ could be sintered to 95.3% TD only at 1740° C. and in an atmosphere of nitrogen having an oxygen partial pressure of $10^{-11}$ atm. The main inhibition to densification appears to be the volatilization of chromium oxides in oxidizing atmospheres. The oxidation and volatilization of lanthanum chromite in oxidizing atmospheres at temperatures higher than 1400° C. has indeed been reported by Meadowcroft and Wimmer (75th Annual Meeting of the Am. Ceram. Soc., Cincinnati, (1973) and D. B. Meadowcroft and J. M. Wimmer, Am. Ceram. Soc. Bull., 58, 610 (1979)) and involves the oxidation of Cr(III) to Cr(VI) and formation of fugitive $CrO_3$ which is a gas at the high temperatures of sintering. Therefore, the preparation of lanthanum chromite powders which sinter to close porosity at temperatures below about 1450° C., so that Cr volatilization is insignificant, is critical for the development of fuel cell fabrication technology. Reduction in the sintering temperature of a ceramic powder is achieved by controlling the composition, homogeneity, grain size, and morphology of the powder. The most promising approach in achieving all these requirements is to use sol- gel technology, i.e. solution chemistry, and improved powder separation and processing technology.

An improved sol-gel method has been disclosed by U.S. Pat. No. 4,830,780, to Olson et al., for the preparation of lanthanum chromite doped with the divalent ions of magnesium, strontium, calcium or barium by coprecipitation from salt solutions of lanthanum, chromium and dopant ions with ammonium hydroxide. In this patent disclosure, extensive washing of the precipitated gel is not needed because residual ammonium ion is removed via the gas phase during powder calcination. Upon calcination at temperatures of about 600° C., the gel converts to a single compound with the huttonite structure, $LaCrO_4$, which upon further calcination at 900° C. converts to pure lanthanum chromite, $LaCrO_3$, with average particle size of about 0.5 $\mu$m. This powder could be sintered to 95.7% of theoretical density when fired at 1650° C. for 4 hours in a graphite furnace and to 78 % theoretical density at 1600° C. for 2 hours in a furnace with oxygen partial pressure of $10^{-10}$ atmospheres. Densification of this lanthanum chromite to the indicated densities was much better than what was achievable by the prior art as, for example, stated by Groupp and Anderson. However, the sintering temperature of this reactive powder is still higher than what is needed for monolithic solid oxide fuel cell applications.

Densification of lanthanum chromite at much lower temperatures has been disclosed in U.S. Pat. No. 4,749,632 to Flandermeyer et al. This was achieved by the incorporation into the lanthanum chromite of a sintering aid, that is, a compound or mixture of compounds which have melting points much lower than 1400° C. For example, lanthanum chromite mixed with 10 w% boric acid powder was formed into a tape and fired at 1377° C. to a density of about 94% of theoretical density. Note that boric acid, $H_3BO_3$, melts at about 160° C. with simultaneous dehydration to $HBO_2$, while boron oxide, $B_2O_3$, a product of boric acid upon further dehydration, melts at about 460° C. In another example, the sintering aid was made up of 8 w% (Ca,Cr) oxide, which has a eutectic point at about 1022° C., and 6 w% $B_2O_3$ and, because of the low melting point of $B_2O_3$, the melting point of this sintering aid mixture would be expected to be very much lower than 1000° C. A mixture of lanthanum chromite with the [$B_2O_3$, (Ca,Cr) oxide] sintering aid was fired to about 90% of theoretical density at 1277° C.

Thus, U.S. Pat. No. 4,749,632 teaches sintering of lanthanum chromite at low temperatures by the incorporation of relatively large quantities of compounds which melt at low temperatures and are referred to as sintering aids. However, the use of relatively large quantities of low-temperature melting compounds would be expected to result in migration of some of the sintering aid ions into the adjacent layers during sintering and, therefore, affect the sintering behavior and electrical performance of these layers. These sintering aids may be deleterious to the fabrication and operational performance of the monolithic solid oxide fuel cell.

SUMMARY OF THE INVENTION

The present invention provides a lanthanum chromite powder which is so sinter reactive that it sinters at temperatures lower than 1650° C. The sintering temperature of this powder is decreased further, in accordance with the invention, by incorporation therein of small amounts of compounds that have melting temperatures of about 1300° C. In this manner there is provided a lanthanum chromite powder mixture which sinters at a temperature as low as 1400° C. and which consists essentially of 1 mol of $LaCr_{1-x}M_{x3}$, where M is a divalent metal selected from the group consisting of magnesium, calcium and mixtures thereof and x ranges from 0.03 to 0.3, y mols of $B_2O_3$, where y ranges from 0.005 to 0.04, and z mols of $La_2O_3$, where the ratio z/y ranges from about 1.1 to 3. In addition, the invention provides a process for preparing the powder mixture, and a ceramic obtained upon sintering a compact of the powder mixture. The lanthanum chromite powder mixture of the present invention is a strong candidate material for fabrication of the monolithic solid oxide fuel cell as well as for heating elements of electric furnaces and electrode materials in magnetohydrodynamic devices wherein high electrical conductivity and corrosion resistance at elevated temperatures are required.

Generally stated, the process for preparing the lanthanum chromite powder mixture comprises the steps of:

i. preparing a lanthanum chromite precursor described essentially by the formula $LaCr_{1-x}M_{x3}$.(Adsorbate) where M is a divalent metal selected from the group consisting of magnesium, calcium or mixtures thereof, x is in the range of 0.03 to 0.3, and Adsorbate is volatile matter which is adsorbed on the powder and is present in an amount ranging up to 35 weight percent based on the total weight of the precursor, the preparation of the precursor comprising the steps of:

(a) reacting a solution containing a lanthanum compound and a chromium compound in an atomic ratio of La:Cr of 1:1-x with a stoichiometric excess of ammonium hydroxide to precipitate an intermediate hydroxide in the form of a slurry;

(b) washing the precipitated intermediate hydroxide with a solution of ammonium hydroxide in deionized (DI) water or a DI water/alcohol mixture to remove most of the anions from the lanthanum and chromium compounds used in step (a) and to yield a slurry in a water/alcohol liquid;

(c) adding to the hydroxide slurry obtained in step (b) a solution of an M compound taken in such quantity as to yield an atomic ratio of La:Cr:M of 1:1-x:x where M is a divalent metal selected from the group consisting of magnesium, calcium and mixtures thereof;

(d) separating the powder from the water/alcohol liquid at supercritical conditions, wherein temperature and pressure are equal to or greater than the critical point of the water/alcohol liquid, such preparation being conducted during a batch or continuous process to obtain the lanthanum chromite powder precursor;

ii. calcining the lanthanum chromite precursor at a temperature ranging from 650° C. to 1100° C. for a time ranging from 0.5 to 4 hours to obtain a sinter reactive lanthanum chromite ceramic powder having the formula $LaCr_{1-x}M_{x3}$; and iii. incorporating into the $LaCr_{1-x}M_{x3}$ ceramic powder z mols of $La_2O_3$ and y mols of $B_2O_3$ where y ranges from 0.005 to 0.04 mols per mol of $LaCr_{1-x}M_{x3}$ and the ratio of z/y ranges from about 1.1 to 3.

Still another embodiment of this invention is the ceramic product which is obtained by firing the powder mixture prepared from the aforementioned process steps. This lanthanum chromite powder mixture may be formed into powder compacts or components by any suitable method such as uniaxial pressing, cold isostatic pressing, slip-casting, die pressing, tape casting or calendering and sintered in oxidizing or other atmospheres in the temperature range of 1400° C. to 1500° C. to obtain dense lanthanum chromite with density higher than about 95% of theoretical density. The sintered product is a mixture of approximately 1 mol of $LaCr_{1-x}M_{x3}$, where M is a divalent metal selected from the group consisting of magnesium, calcium and mixtures thereof and x ranges from 0.03 to 0.3, y mols of $B_2O_3$, where y ranges from 0.005 to 0.04, and z mols of $La_2O_3$, preferably from 1.4 to 2.

DETAILED DESCRIPTION OF THE INVENTION

The principal component of the powder mixture of the present invention is lanthanum chromite. This lanthanum chromite is prepared from a lanthanum chromite precursor powder having extremely fine grain size.

The lanthanum chromite precursor powder is amorphous or microcrystalline and has the empirical formula $LaCr_{1-x}M_{x3}$.(Adsorbate) where M is a divalent metal selected from the group consisting of magnesium, calcium and mixtures thereof, x ranges from 0.03 to 0.3, and Adsorbate is volatile matter which is adsorbed on the powder. The composition of the adsorbate is not precisely known but consists essentially of water, alcohols and other organic adducts. The adsorbate is present in an amount up to about 35 weight percent of the total as-produced lanthanum chromite precursor. Although the empirical formula has been given as being stoichiometric, it may in certain cases be beneficial to incorporate into the precursor powder up to about 20 atom percent excess chromium.

Accordingly, a first step in preparing the lanthanum chromite precursor is reacting a solution of lanthanum and chromium with a solution of ammonium hydroxide. It is necessary that the atomic ratio of lanthanum and chromium in the solution be the same as that of the precursor compound, that is 1:1-x. The liquid used to make the solutions may be water, organic solvents or their mixture, with water/alcohol mixtures being the Preferred solvent. Any compounds of lanthanum and chromium may be used to make the solutions provided these compounds have sufficient solubility in the chosen solvent.

When the desired solvent is water or water/alcohol mixtures the compounds of lanthanum and chromium used to make the solutions may be, but are not limited to, chloride, nitrate, acetate, etc., salts. These salts include but are not limited to lanthanum chloride, lanthanum bromide, lanthanum nitrate, lanthanum acetate, chromium chloride, chromium bromide, chromium nitrate, chromium acetate. It is not necessary that the salts used in the preparation of the solution have a common anion.

An intermediate insoluble hydroxide with lanthanum and chromium in atomic ratio corresponding to that of the precursor or final lanthanum chromite, that is, ratio of 1:1-x is coprecipitated by mixing a solution of the desired compounds with a solution containing a stoichiometric excess of ammonium hydroxide. Precipitation of these metals at pH of 9 to 10 is essentially quantitative. The solution containing the metal salts is added to the solution of ammonium hydroxide under vigorous stirring or vice versa. However, addition of the metal salt solution to the hydroxide solution is the preferred method of mixing the solutions for coprecipitation. The metal salts may be dissolved in one solution or in separate solutions. In the case of separate metal solutions, the solutions should be added simultaneously, at the same location and the molar feed rates of the metals should correspond to the atomic ratio of the metals in the precursor and final lanthanum chromite.

The insoluble hydroxide intermediate, i.e. the coprecipitate formed from mixing the lanthanum and chromium solution with the ammonium hydroxide solution according to the method of the present invention contains the lanthanum and chromium metals in the same atomic ratio as the final lanthanum chromite. This coprecipitate is voluminous, may be gelatinous, and, at high metal concentration, may turn into a rigid gel. However, it is preferred that the metal concentration be controlled at such levels that the precipitate forms a dispersion of high fluidity and this dispersion will be referred to as gel. In this context, the word gel is meant to denote a dispersion or slurry of precipitated or coprecipitated particles, which are aggregates of nanometer-size particles, in a liquid phase. The solids concentration and the viscosity of this dispersion are such that the gel flows relatively easily, is fairly stable, and can be pumped by any conventional slurry pump, such as a diaphragm pump.

The gel or slurry obtained from the coprecipitation step is then subjected to washings with a solution of ammonium hydroxide in deionized (DI) water or DI water/alcohol mixtures to remove the anions, that is, chlorides, bromides, nitrates or acetates from the lanthanum and chromium compounds used in the preparation of the hydroxide intermediate. This washing may be performed using batch or continuous processes. Throughout the washing cycle the pH of the slurry should be maintained at about 9-10 using ammonium hydroxide or other suitable pH balancing agent. In a laboratory-scale batch process, the slurry is diluted with the appropriate wash liquid and stirred, and the precipitate is allowed to settle by gravity. The clear supernatant liquid containing the soluble anions is then decanted, and the wash process is repeated until the anion concentration is sufficiently low. Precipitates from halides, need to be washed thoroughly because residual halides in the final ceramic powder may degrade the powder s sintering behavior or mechanical properties. Thorough washing of nitrate or acetate anions is not necessary because residual amounts of such anions are easily removed during subsequent calcination steps. The composition of the wash liquid is progressively changed from DI water to alcohol in order to have the Precipitate dispersed in a water/alcohol mixture with the concentration of water at about 20 w% at the end. Any alcohol may be used but monohydric alcohols with low molecular weight are preferred. Isopropanol, a widely used chemical solvent, is the most preferred alcohol.

To the slurry of the washed hydroxide gel is then added a solution of an M compound where M is a divalent metal such as magnesium or calcium and the compounds may be nitrate, acetate, or other soluble inorganic or organic salts which decompose at temperatures in the range of 200° C. to 600° C. The quantity of the M compound solution which is used should be such that the atomic ratio of the lanthanum and chromium in the hydroxide precipitate and M in the solution should be the same as the desired composition in the precursor or the final ceramic lanthanum chromite, that is, La:Cr:M should be equal to 1:1-x:x.

The water/alcohol slurry of the precipitated hydroxide and the dissolved M compound is then subjected to a supercritical separation. In other words, the powder is released from the liquid at temperature and pressure equal to or greater than the critical point of the water/alcohol liquid in a batch or continuous process. Under supercritical conditions the surface tension of the liquid is about zero, the solid particles are released from the liquid phase without compaction and, therefore, the Powder is in a highly divided state, i.e., the size of the particles is of the order of one nanometer. The powder which is produced from the supercritical separation is usually amorphous and retains adsorbed water and organic molecules. This powder is the precursor lanthanum chromite with empirical formula $LaCr_{1-x}M_{x3}$.(Adsorbate) where Adsorbate is adsorbed volatile matter consisting of water, alcohols such as isopropanol, and other organic adducts whose composition is not precisely known.

Sinter-reactive lanthanum chromite powder with chemical formula $LaCr_{1-x}M_{x3}$, where M is a divalent metal selected from the set of magnesium, calcium and mixtures thereof and x is in the range of 0.03 to 0.3, is prepared from the lanthanum chromite precursor which is produced according to the present invention as discussed hereinabove. To this end, the lanthanum chromite precursor powder is subjected to calcination in air to release adsorbed water and organic adducts and to crystallize the powder followed by deagglomeration of the calcined powder to reduce its particle size distribution.

In heating up the lanthanum chromite precursor in air the major weight loss of adsorbate usually occurs below 400° C. with complete burn off at temperatures of about 550° C. Calcination of the powder at 550° C. in air for 2 hours converts the amorphous powder to a crystalline material which is a mixture of lanthanum chromite, huttonite with chemical formula isostructural to $LaCrO_4$, and small amounts of lanthanum chromium oxide with chemical formula isostructural to $La_2CrO_6$. On the other hand, calcination of the precursor powder at 750° C. in air for 2 hours leads to the formation of perovskite lanthanum chromite with only trace quantities of huttonite and lanthanum chromium oxide which completely disappear during densification. The calcination temperature and time are selected to tailor the physical properties of the ceramic powder (i.e. surface area, pore volume and particle size distribution) to suit the requirements of specific ceramic green forming processes. Generally, calcination of the lanthanum chromite precursor powder in the range of 650° C. to 1100° C. for 0.5 to 5 hours followed by deagglomeration yields lanthanum chromite powder with composition $LaCr_{1-x}M_xO_3$ where M is magnesium or calcium and x is in the range of 0.03 to 0.3. This powder is very sinter-reactive and, under controlled atmospheres, powder compacts sinter to densities of at least 95 % of theoretical at sintering temperatures as low as 1600° C.

Although the sintering temperature of 1600° C. for the powder of the present invention is lower than the temperatures required to sinter lanthanum chromite powders prepared by other state-of-the-art processes, this temperature is still too high for monolithic solid oxide fuel cell applications. Therefore, other means of decreasing this temperature are required. This is achieved by mixing the sinter-reactive powders of the present invention with small quantities of boric acid or boron oxide, $B_2O_3$, and lanthanum oxide, $La_2O_3$, where the molar ratio of $La_2O_3$ to $B_2O_3$ ranges from about 1.1 to 3 (the atomic ratio of La to B is also the same) or preferably this molar ratio ranges from about 1.4 to 2. Lanthanum and boron oxide mixtures taken in the molar ratio of 1.1 to 3 have melting points in the range of 1311° C. to about 1500° C. [see FIG. 321 in Phase Diagrams for Ceramists, 3rd ed., (1974)] and after firing yield high melting, crystalline lanthanum borate compounds which bind the labile boron ions. Moreover, these crystalline compounds would also be expected to prevent or inhibit the migration of boron ions into adjacent layers in the monolithic solid oxide fuel cell during operation and, therefore, contribute to the chemical and electrical stability of this fuel cell.

The boron and lanthanum oxides may be added to the lanthanum chromite as individual oxides or as prereacted lanthanum borates or they may be precipitated onto the lanthanum chromite powder by any suitable means. The mixing of lanthanum chromite with boron and lanthanum oxide or with lanthanum borate powders (La:B = 1.1 to 3) may be achieved by any powder mixing technique such as dry or wet ball-milling. Wet chemical techniques may be used to mix lanthanum chromite with finely divided lanthanum and boron oxides. Lanthanum hydroxide may be precipitated on chromite powder by adding ammonia to a suspension of lanthanum chromite powder in a liquid containing dissolved lanthanum nitrate. After removal of the nitrate anions from the suspension by washing, dissolved boron oxide is added to the suspension which is then dried free of liquid. The lanthanum chromite powder containing boron and precipitated lanthanum compounds is then calcined at about 500° C. to decompose residual nitrates and remove any volatile matter and to prereact the boron and lanthanum compounds with the surface of lanthanum chromite.

The resultant boron and lanthanum containing chromite powder is then formed into powder compacts for firing. Powder compacts for sintering can be formed by well known processes such as uniaxial pressing, cold isostatic pressing, extrusion, injection molding, roll pressing, tape casting and other ceramic forming techniques. Powder compacts containing small amounts of lanthanum and boron oxides, taken in the molar ratio of 1.1 to 3 or, preferably, in the ratio of 1.4 to 2, sinter to better than 97% of theoretical density when fired at 1400° C. in air for one (1) hour. Since these lanthanum chromite powder mixtures sinter to near full density in air at temperatures as low as 1400° C., these powders would be expected to facilitate the Process of fabricating monolithic solid oxide fuel cells.

In order to more fully describe the advantages to be derived from the present invention, the following examples are set forth. These examples are considered illustrative only and should not be construed to limit the scope of the invention as defined in the subjoined claims.

EXAMPLE 1

A five-gallon polyethylene container was loaded with three liters of isopropanol (2-propanol) and one and a half (1.5) liters of concentrated ammonium hydroxide which typically contains 28–30 w% ammonia. This ammonia/water/isopropanol solution is denoted as solution A. In another container a solution of lanthanum nitrate and chromium nitrate was prepared by dissolving 649.5 grams of $La(NO_3)_3.6H_2O$ and 540.0 grams of $Cr(NO_3)_3.9H_2O$ in thirteen (13) liters of isopropanol. The resultant solution of lanthanum and chromium nitrates is denoted as solution B.

Solution B was added to solution A dropwise under vigorous stirring with a shear mixer rotating at about 1500 revolutions per minute. A voluminous, greenish precipitate of lanthanum/chromium hydroxides formed instantaneously. This precipitate was kept well dispersed by maintaining the pH greater than 9.5 (using excess ammonia) throughout the precipitation step and by the vigorous stirring. The latter also provided for uniform pH conditions and, therefore, instantaneous precipitation of the lanthanum/chromium hydroxides throughout this step.

The lanthanum/chromium hydroxide precipitate or gel was then subjected to several washes with DI water/isopropanol (15 volume percent water) mixtures by batch gravity settling methods to reduce the nitrate concentration to less than about 5 Percent of its initial value while maintaining the pH to about 9.5 throughout the washing cycle.

To the washed hydroxide gel were added 32.2 grams of magnesium acetate tetrahydrate $(Mg(CH_3COO)_2.4H_2O)$ dissolved in one (1) liter of DI water/isopropanol (15 volume percent water). The resultant gel was then subjected to solid/liquid separation using the continuous process described in U.S. Pat. No. 4,845,056 to obtain the lanthanum chromite precursor, $LaCr_{0.9}Mg_{0.1}O_3$.(Adsorbate), powder. This precursor powder was amorphous and in a highly divided state as indicated by its surface area of about 180 $m^2/g$.

EXAMPLE 2

A batch of lanthanum chromite precursor was prepared by a procedure identical to that used in Example 1 except that magnesium nitrate was used instead of magnesium acetate. The as-produced precursor powder had a surface area of 185 $m^2/g$.

EXAMPLE 3

The lanthanum chromite precursor powder prepared as described in Example 2 was subjected to calcination at various temperatures. As a result of calcination adsorbed water and organic adducts on the precursor powder were removed or burnt off and the precursor crystallized into magnesium-doped lanthanum chromite. The surface area of the calcined powder is shown in Table 1.

TABLE 1

Surface Area of Calcined Lanthanum Chromite Power

| Calcination Temp. (°C.) | Heating Rate (°C./min) | Calcination Time (h) | Surface Area (m²/g) |
|---|---|---|---|
| 600 | 5 | 2 | 13.8 |
| 650 | 5 | 2 | 9.9 |
| 700 | 5 | 2 | 6.0 |
| 800 | 5 | 2 | 6.0 |
| 850 | 5 | 2 | 4.6 |
| 700 | Uncontrolled | 3 | 25.5 |

These data show that by controlling the calcination time and temperature the surface area and the particle size distribution of the lanthanum chromite powder can be tailored to suit the requirements of the forming process which is used to make powder compacts for the fabrication of sintered ceramic components.

EXAMPLE 4

Precursor lanthanum chromite prepared according to the method described in Example 2 was calcined at 850° C. for two (2) hours in air to yield ceramic powder of magnesium-doped lanthanum chromite, $LaCr_{0.9}Mg_{0.1}O_3$.

Boric acid and lanthanum hydroxide were precipitated on small quantities of the $LaCr_{0.9}Mg_{0.1}O_3$ according to the following procedure. 0.1281 g of $B_2O_3$ and 1.6 g of $La(NO_3)_3 \cdot 6H_2O$ were dissolved in a solution consisting of 14 g of isopropanol, 3 g of water, and about 0.33 g of $HNO_3$. To this solution there was added 10 g of $LaCr_{0.9}Mg_{0.1}O_3$ under stirring to yield a suspension. 20 drops or about 0.7 g of concentrated ammonium hydroxide was then added dropwise to the suspension to precipitate lanthanum hydroxide and the resultant slurry was allowed to dry at ambient temperature. The dried powder was subsequently calcined at 550° C. to remove residual nitrate and adsorbed water and isopropanol. The calcined product was a brown ceramic powder of $LaCr_{0.9}Mg_{0.1}O_3$ containing the equivalent of 4.33 mol of $B_2O_3$ and 4.33 mol of $La_2O_3$ per 100 mols of magnesium-doped lanthanum chromite as sintering aids (this composition corresponds to 4 mol% B on a total metal basis). The exact chemical states of $B_2O_3$ and of $La_2O_3$ in the calcined powder are not known but are expected to be in the form of individual or complex oxides. The same procedure was used to prepare a small batch of $LaCr_{0.9}Mg_{0.1}O_3$ containing the equivalent of 3.18 mol% of $B_2O_3$ and 3.18 mol of $La_2O_3$ per 100 mols of magnesium-doped lanthanum chromite as sintering aids. The ratio of $La_2O_3$ to $B_2O_3$ or of La to B is equal to one in these powders and the composition of the sintering aids corresponds to $LaBO_3$.

The calcined powders were used to make powder compacts by uniaxial pressing in a half inch die under a load of 10,000 pounds. These disks were then fired in air by ramping the furnace temperature at 100° C./h to 1400° C., holding at 1400° C. for one (1) hour, and cooling to room temperature at 200° C./h. Sintering results are shown in Table 2.

TABLE 2

Sintering of Lanthanum Chromite

| Chromite (mol) | $B_2O_3$ (mol) | $La_2O_3$ (mol) | $La_2O_3:B_2O_3$ (mol:mol) | Green* Density | Fired* Density |
|---|---|---|---|---|---|
| 100 | 3.18 | 3.18 | 1 | 46.5 | 71.7 |
| 100 | 3.18 | 3.18 | 1 | 45.2 | 70.7 |
| 100 | 4.33 | 4.33 | 1 | 45.4 | 93.5 |
| 100 | 4.33 | 4.33 | 1 | 47.0 | 92.9 |

*As % of theoretical density which is taken to be 6.65 g/ml

The data of Table 2 show that densification of magnesium-doped lanthanum chromite at 1400° C./1 h is incomplete when the $B_2O_3$ and $La_2O_3$ sintering aids are taken in the molar ratio of one and in amounts of less than 4 mols each Per 100 mols of chromite.

EXAMPLE 5

Precursor lanthanum chromite Prepared according to the method described in Example 2 was calcined at 1050° C. for six (6) hours in air to yield ceramic powder of magnesium-doped lanthanum chromite, $LaCr_{0.9}Mg_{0.1}O_3$.

Boric acid and lanthanum hydroxide were precipitated on small quantities of the $LaCr_{0.9}Mg_{0.1}O_3$ according to the following procedure. 0.0975 g of $B_2O_3$ and. 2.42 g of $La(NO_3)_3 \cdot 6H_2O$ were dissolved in a solution consisting of 15 g of isopropanol, 3 g of water, and about 0.5 g of $HNO_3$ To this solution there was added 10 g of $LaCr_{0.9}Mg_{0.1}O_3$ under stirring to yield a suspension. 30 drops or about 1 g of concentrated ammonium hydroxide was then added dropwise to the suspension to precipitate lanthanum hydroxide and the resultant slurry was allowed to dry at ambient temperature. The dried powder was subsequently calcined at 500° C. for one (1) hour to remove residual nitrate and adsorbed water and isopropanol. The calcined product was a brown ceramic powder of $LaCr_{0.9}Mg_{0.1}O_3$ containing the equivalent of 3.3 mol of $B_2O_3$ and 6.6 mol of $La_2O_3$ per 100 mols of magnesium-doped lanthanum chromite as sintering aids (this composition corresponds to 3 mol% B on a total metal basis). The exact chemical states of $B_2O_3$ and of $La_2O_3$ in the calcined powder are not known but are expected to be in the form of individual or complex oxides. The same procedure was used to prepare a small batches of $LaCr_{0.9}Mg_{0.1}O_3$ containing smaller quantities of $B_2O_3$ and $La_2O_3$ per 100 mols of magnesium-doped lanthanum chromite as sintering aids. The ratio of $La_2O_3$ to $B_2O_3$ or of La to B is equal to two in these powders.

The calcined powders were used to make powder compacts by uniaxial pressing in a half inch die under a load of 10,000 pounds. These disks were then fired in air by ramping the furnace temperature at 100° C./h or 200° C./h to 1400° C., holding at 1400° C. for one (1) hour, and cooling to room temperature at 200° C./h. Sintering results are shown in Table 3.

TABLE 3

Sintering of Lanthanum Chromite with Lanthana/Boria

| Chromite (mol) | $B_2O_3$ (mol) | $La_2O_3$ (mol) | $La_2O_3:B_2O_3$ (mol:mol) | Green* Density | Fired* Density |
|---|---|---|---|---|---|
| 100 | 3.3 | 6.6 | 2 | 53.4 | ~100 |
| 100 | 3.3 | 6.6 | 2 | 53.0 | 99.7 |
| 100 | 2.2 | 4.4 | 2 | 53.4 | 99.7 |
| 100 | 2.2 | 4.4 | 2 | 53.6 | ~100 |
| 100 | 1.6 | 3.2 | 2 | 43.7 | ~100 |
| 100 | 1.6 | 3.2 | 2 | 49.0 | 98.6 |
| 100 | 1.0 | 2.0 | 2 | 44.5 | 96.7 |
| 100 | 1.0 | 2.0 | 2 | 51.7 | ~100 |

*As % of theoretical density which is taken to be 6.65 g/ml

The data of Table 3 show that densification of magnesium-doped lanthanum chromite at 1400° C./1 h is complete when the $B_2O_3$ and $La_2O_3$ sintering aids are taken in the molar ratio of one to two, respectively, and in amounts of less than 4 mols of $B_2O_3$ per 100 mols of chromite. Note that this amount of boron oxide, $B_2O_3$, corresponds to less than about 1.2 w% with respect to the mass of magnesium-doped lanthanum chromite taken. Moreover, this amount of boron oxide is almost an order of magnitude lower than the amount of boron oxide used in Example 1 of U.S. Pat. No. 4,749,632.

Having thus described the invention in rather full detail it will be understood that such detail need not be strictly adhered to but that various changes and modifications may suggest themselves to one skilled in the art, all falling within the scope of the invention as defined by the subjoined claims.

We claim:

1. A lanthanum chromite ceramic powder mixture adapted to sinter at a temperature as low as 1400° C., said mixture consisting essentially of 1 mol of $LaCr_{1-x}M_xO_3$, where M is a divalent metal selected from the group consisting of magnesium, calcium and mixtures thereof and x ranges from 0.03 to 0.3; y mols of $B_2O_3$, where y ranges from 0.005 to 0.04; and z mols of $La_2O_3$, where the ratio z/y ranges from 1.1 to 3.

2. A mixture as recited by claim 1, wherein the ratio, z/y ranges from 1.4 to 2.

3. A mixture as recited by claim 1, wherein M is magnesium.

4. A mixture as recited by claim 1, wherein M is calcium.

5. A process for preparing the lanthanum chromite powder mixture of claim 1, comprising the steps of:
   i. preparing a lanthanum chromite precursor described essentially by the formula $LaCr_{1-x}M_xO_3$.-(Adsorbate) where M is selected from the group consisting of magnesium, calcium or mixture thereof, x ranges from 0.03 to 0.3, and Adsorbate is volatile matter, which is adsorbed on the powder and is present in an amount ranging up to 35 weight % based on the total weight of the precursor, preparation of the precursor comprising the steps of:
      (a) reacting a solution containing a lanthanum compound and a chromium compound in an atomic ratio of La:Cr of 1:1-x with a stoichiometric excess of ammonium hydroxide to precipitate an intermediate hydroxide in the form of a slurry;
      (b) washing the precipitated intermediate hydroxide with a wash liquid composed of a solution of ammonium hydroxide in deionized (DI) water changed progressively to a DI water/alcohol mixture to remove most of the anions from the lanthanum and chromium compounds used in step (a) and to yield a slurry in a water/alcohol liquid;
      (c) adding to the hydroxide slurry obtained in step (b) a solution of an M compound taken in such quantity as to yield an atomic ratio of La:Cr:M of 1:1-x:x where M is a divalent metal selected from the group consisting of magnesium, calcium and mixtures thereof;
      (d) separating the powder from the water/alcohol liquid at supercritical conditions, wherein the temperature and pressure are equal to or greater than the critical point of the water/alcohol liquid, said separation being conducted during a batch or continuous process, to obtain said precursor;
   ii. calcining the precursor at a temperature ranging from 650° C. to 1100° C. for a time ranging from 0.5 to 4 hours;
   iii. deagglomerating said calcined precursor to obtain a sinter reactive lanthanum chromite ceramic powder having the formula $LaCr_{1-x}M_xO_3$; and
   iv. incorporating into the $LaCr_{1-x}M_xO_3$ ceramic powder z mols of $La_2O_3$ and y mols of $B_2O_3$ where y ranges from 0.005 to 0.04 mols per mol of $LaCr_{1-x}M_xO_3$ and the ratio of z/y ranges from 1.1 to 3.

6. A process as recited by claim 5, wherein the ratio z/y ranges from 1.4 to 2.

7. A process as recited by claim 5, wherein said alcohol contains 1 to 5 carbon atoms.

8. A process as recited by claim 5, wherein said alcohol is isopropanol.

9. A sintered ceramic product produced from the ceramic powder of claim 1 by firing a powder compact at a temperature in the range of 1400° C. to 1500° C. in air, said sintered product comprising approximately 1 mol of $LaCr_{1-x}M_xO_3$, where M is a divalent metal selected from the group consisting of magnesium, calcium and mixtures thereof and x ranges from 0.03 to 0.3; Y mols of $B_2O_3$, where y ranges from 0.005 to 0.04; and z mols of $La_2O_3$, where the ratio z/y ranges from 1.1 to 3.

10. A product as recited by claim 9, wherein the ratio, z/y, of $La_2O_3$ to $B_2O_3$ ranges from 1.4 to 2.

11. A product as recited by claim 9, wherein M is magnesium.

12. A product as recited by claim 9, wherein M is calcium.

* * * * *